[19] United States Patent
Dunn et al.

[11] Patent Number: 5,020,910
[45] Date of Patent: Jun. 4, 1991

[54] MONOLITHIC DIFFRACTION SPECTROMETER

[75] Inventors: William C. Dunn, Mesa; Stuart T. Langley, Phoenix, both of Ariz.

[73] Assignee: Motorola, Inc., Schaumburg, Ill.

[21] Appl. No.: 488,158

[22] Filed: Mar. 5, 1990

[51] Int. Cl.$^5$ .......................... G01J 3/18; G01J 3/36
[52] U.S. Cl. .................. 356/328; 350/162.23; 350/162.24; 357/30
[58] Field of Search ............ 356/300, 319, 326, 328, 356/334; 350/96.11, 96.19, 162.2–162.24; 357/30 L; 250/226

[56] References Cited

U.S. PATENT DOCUMENTS

| | | | |
|---|---|---|---|
| 4,746,186 | 5/1988 | Nicia | 350/96.19 |
| 4,798,464 | 1/1989 | Boostrom | 356/328 |
| 4,852,079 | 7/1989 | Kinney et al. | 356/328 |

FOREIGN PATENT DOCUMENTS

| | | | |
|---|---|---|---|
| 174925 | 10/1983 | Japan | 350/96.11 |
| 219008 | 9/1986 | Japan | 350/96.11 |
| 79020 | 4/1988 | Japan | 356/328 |
| 113707 | 5/1989 | Japan | 350/96.11 |

Primary Examiner—F. L. Evans
Attorney, Agent, or Firm—Stuart T. Langley

[57] ABSTRACT

A monolithic diffraction spectrometer having a diffraction grating formed over a light sensing array is provided. The diffraction grating serves to diffract wavelengths of interest to an underlying photosensitive device while diffracting other wavelengths away from the photosensing element. By forming a diffraction grating with a variable pitch, or multiple diffraction gratings having various pitches, any number of specific light wavelengths can be detected with a high degree of precision. When a diffraction grating having a pitch which is in the order of the incident wavelength of light is used, improved sensitivity is achieved.

10 Claims, 2 Drawing Sheets

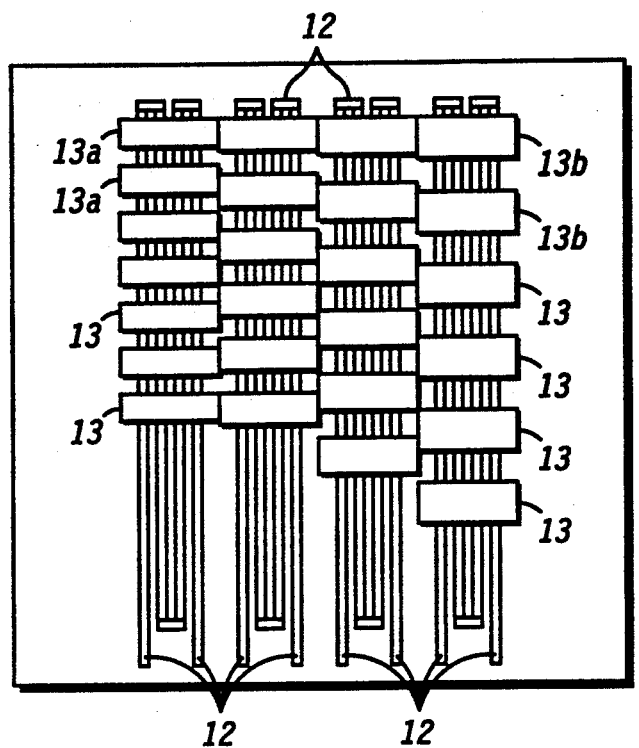
FIG. 1
FIG. 2
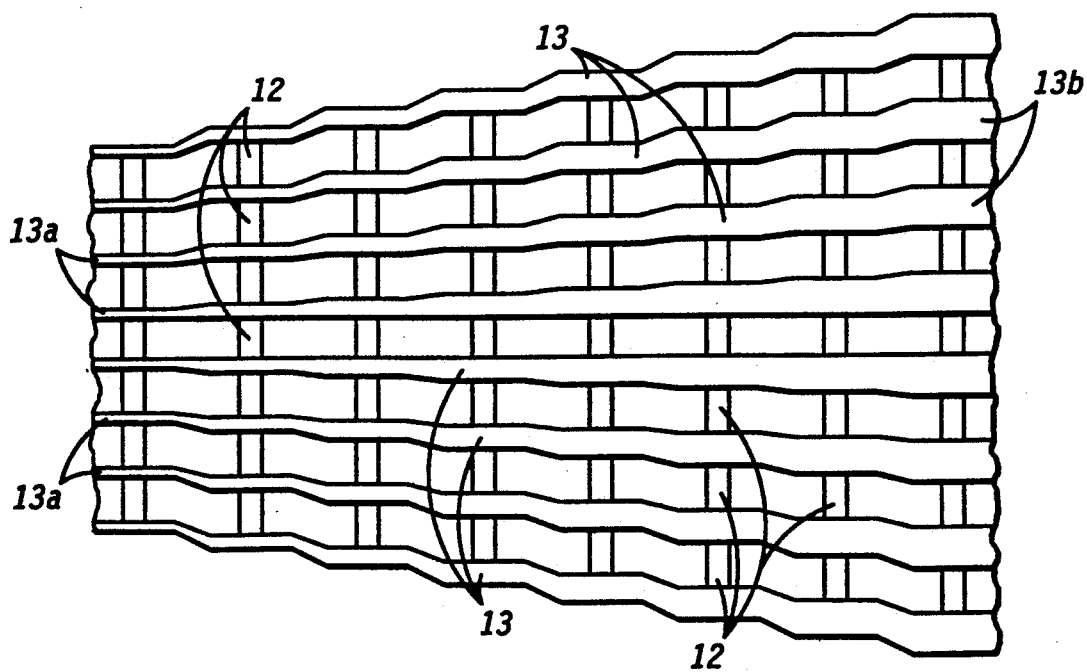

MONOLITHIC DIFFRACTION SPECTROMETER

BACKGROUND OF THE INVENTION

This invention is related, in general, to spectrometers, and more particularly to a monolithic diffraction spectrometer formed on a semiconductor chip.

Spectrometers are used in a variety of laboratory analysis and research instruments. Spectrometers break a beam of polychromatic incident light into multiple bands of monochromatic light. Since most materials have a characteristic combination of colors which are emitted or reflected, a spectrometer can be used to identify material type or composition of a light emitting or light reflecting target.

Many applications exist for small compact spectrometers which could be used for a fast, relatively accurate analysis of an incident light beam. For example, automotive fuel monitoring, spark color monitoring, and in-line process control equipment all could use an inexpensive color analysis device. Unfortunately, most commercial spectrometers use multiple optical elements such as lenses, reflectors, and diffraction gratings which are both bulky and difficult to align. One such spectrometer is described in U.S. Pat. No. 4,798,464 issued to Roy E. Boostrom. These mechanical and optical elements create a somewhat delicate instrument which cannot be used in many commercial applications. Also, additional electronic components had to be used to process the spectrometer output. It is believed that the physical separation between the diffraction grating and the processing components created many oportunities of noise, both electronic and light caused, to interfer with the diffraction signal. Further, the size of such a spectrometer limits the applications in which it can be used. Size, complexity, and additional cost associated with complexity make most available spectrometer designs suitable only for laboratory use.

In addition to spectroscopy, imaging devices such as color television cameras require color separation and detection. Color cameras require only three or four wavelength bands to be separated, and so are simpler than spectrometers. Conventional transmission filters have been used to filter polychromatic incident light into the desired three or four bands. The filtered light is then directed to an imaging device such as a charge coupled device (CCD). Because of the added complexity, diffraction grating technology has not been used with color cameras.

Most spectrometers use a diffraction grating to split the incident light beam into separate wavelengths. A diffraction grating is merely an opaque material having a number of transparent slits formed at regular intervals. As light is transmitted through the plurality of slits, each wavelength is bent, or diffracted, at a unique diffraction angle. The diffraction angle is a function of both the wavelength of light and spacing between the slits of the diffraction grating.

In the past, diffraction spectrometers have been made using diffraction gratings having a slit width which is large in comparison to the wavelength of light passing through it. Also, the spacing between slits is usually large with respect to the wavelength of light to be diffracted. Visible light has wavelengths in the range of 0.5 to 1.0 microns. Typical diffraction gratings used in diffraction spectrometers have slit width and slit spacing in the order of 2 to 10 microns. A 2 micron resolution is considered high precision due to the large diffraction angle which results. Until now, however, diffraction gratings with diffraction spacings and slit widths less than the wavelength of incident light have not been used.

Diffraction gratings are usually constructed with a constant pitch. That is to say, slit width and spacing over the entire diffraction grating are constant rather than variable. A slit width less than the wavelength of incident light causes the light to be completely dispersed as it passes through the diffraction grating. Thus, incident light having wavelength ($\lambda$) equal to 1.0 micron will be completely dispersed when traveling through a diffraction grating or slit having a width of 0.7 microns. A diffraction spectrum formed using such a diffraction grating will not show any color bands of wavelengths larger than 0.7 microns because all of these wavelengths are dispersed before forming an image in the spectrum. Because constant diffraction spacing and slit width have been used in spectrometers, diffraction gratings slit width and spacing less than 1.0 micron have had little utility since they would undesirably filter signals.

Usually, a spectrometer requires a diffraction grating having a large number of slits. Also, the diffraction grating is located a significant distance from the means for detecting the diffracted spectrum. This combination allows a diffraction spectrum to form where each color in the spectrum has a relatively large intensity due to the large number of slits which make up each band in the spectrum. The light diffracted from each of the slits combines additively to produce a very intense spectrum which can be easily analyzed. However, this large spacing between the diffraction grating and the means for detecting the diffracted spectrum has made it impossible to integrate the diffraction grating on the same substrate as the means for detecting the diffracted spectrum.

Accordingly, it is an object of the present invention to provide a spectrometer formed on a single semiconductor chip.

A further object of the present invention to provide a spectrometer with reduced need for external optical elements.

Another object of the present invention is to provide a monolithic color imaging device.

Another object of the present invention is to provide a spectrometer which is relatively inexpensive.

A further object of the present invention is to provide a spectrometer which can be integrated with a number of conventional semiconductor processing techniques.

SUMMARY OF THE INVENTION

These and other objects and advantages are provided by a monolithic diffraction spectrometer having a diffraction grating formed over a light sensing array. The diffraction grating serves to diffract wavelengths of interest to an underlying photosensitive device while diffracting other wavelengths away from the photosensitive device. By forming a diffraction grating with a variable pitch, or multiple diffraction gratings having various pitches, any number of specific light wavelengths can be detected and a high degree of precision is achieved. Further, by using a diffraction grating having a slit width which is in the order of the incident wavelength of light, improved sensitivity can be achieved.

BRIEF DESCRIPTION OF THE DRAWINGS

FIGS. 1 and 2 illustrate plan views of first and second embodiments of the monolithic spectrometer of the present invention;

DETAILED DESCRIPTION OF THE DRAWINGS

Figure 3:
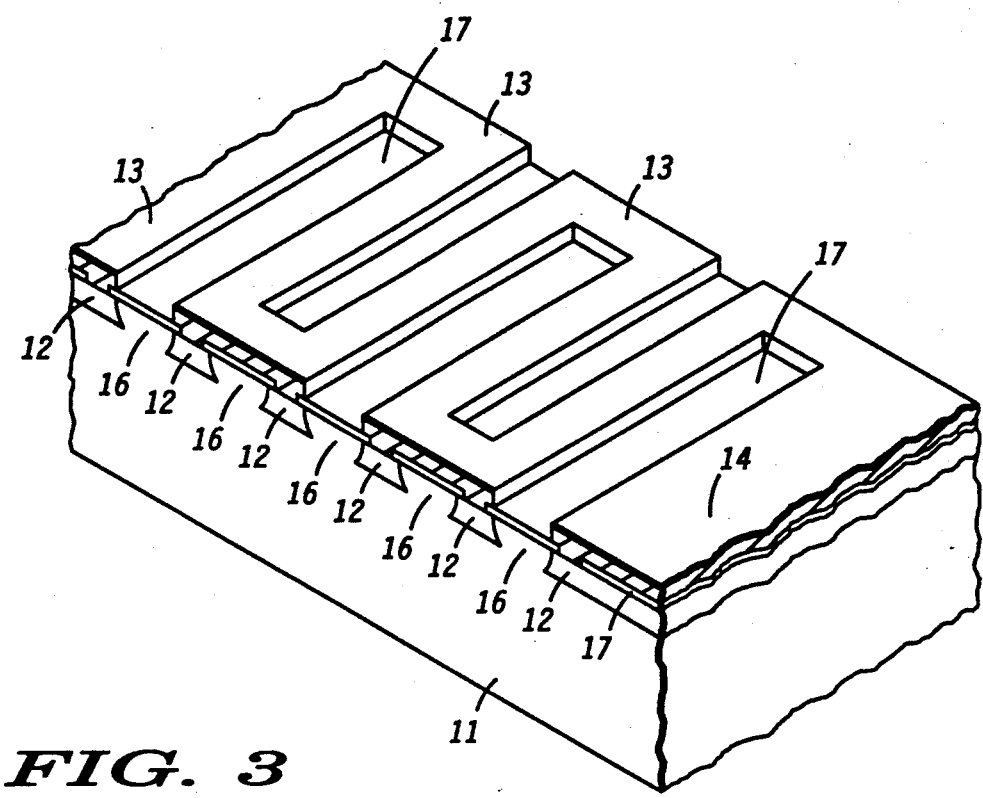
FIG. 3 illustrates a perspective view of a third embodiment of the present invention.

FIGS. 1 and 2 illustrate two topologies which may be used to form a spectrometer of the present invention. FIG. 1 shows a plurality of light sensing elements 12 which are formed on a substrate 11. Conveniently, light sensing elements 12 comprise photodiodes formed in a semiconductor substrate 11. Alternatively, light sensing elements 12 may comprise a CCD array or the like. The diffraction grating 13 comprises a plurality of opaque elements which are spaced at varying pitches and have varying slit widths. For example, diffraction grating 13 comprises elements 13a which are 0.5 micron wide and separated by a 0.5 micro space. The diffraction grating formed by elements 13a is therefore laid out on a 1.0 micron pitch. Diffraction elements 13b, however, are 1.0 micron wide, having a 1.0 micron slit. Thus, diffraction elements 13b are on a 2.0 micron pitch. The other diffraction elements 13 which are not labeled in FIG. 1 are formed at any desired pitch.

Light sensing elements 12 which are formed under diffraction elements 13a are exposed only to wavelengths less than 0.5 microns. Any wavelength larger than this will be completely diffracted and thus be so dispersed as to not cause a significant effect in light sensing element 12. Light sensing elements 12 which are underneath diffraction grating elements 13b on a 2.0 micron pitch are sensitive to all wavelengths. Only infrared wavelengths will be diffracted by elements 13b. Thus, light sensing element 12 under diffraction elements 13a will produce a signal only when blue light or ultraviolet light is incident on the grating, while light sensing elements 12 under diffraction elements 13b will produce a signal when any visible light is incident on grating 13.

FIG. 2 illustrates another embodiment employing a similar scheme. Elements 12 and 13 correspond to the same elements shown in FIG. 1. The second embodiment shown in FIG. 2 differs from the embodiment shown in FIG. 1 in that diffraction grating 13 is formed of continuous fan-shaped opaque lines which have varying thickness across the device. For example the diffraction grating at the end shown generally at 13b, has a 1.0 micron pitch, while the diffraction grating 13a has a 0.5 micron pitch. In this embodiment, a 1 micron spacing is maintained between each of the lines of the diffraction grating. It is believed that this topology, like the embodiment illustrated in FIG. 1, will result in light sensing elements 12 receiving primarily blue and ultraviolet energy under diffraction elements 13a, while light sensing elements 12 under diffraction elements 13b receive the entire spectrum. The signal generated by light sensing elements 12 can be analyzed to form a spectrum of the incident light.

It should be apparent that diffracting elements 13 shown between 13a and 13b in both FIG. 1 and FIG. 2 operate in a similar manner to as 13a and 13b and are adapted to detect particular wavelengths. An increased number of elements 12 and 13 result in higher precision of the device. It may sometimes be desirable to detect only a single wavelength in which case a diffraction grating 13 having a constant pitch may be used. Further, variable pitch diffraction grating elements may be stacked on top of each other rather than arranged adjacent to each other as shown in FIG. 1 and FIG. 2.

FIG. 3 illustrates a third embodiment of the present invention in perspective view. FIG. 3 also illustrates some processing detail which is involved in producing the monolithic spectrometer of the present invention. Substrate 11 conveniently comprises a semiconductor material which is doped n-type. It should be understood that either n- or p-type conductivity can be used so long as junctions are formed as described hereinbelow. An epitaxial layer having an opposite conductivity type of substrate 11 is formed on substrate 11. The epitaxial layer may also be formed by implanting a dopant over the entire surface of substrate 11. Thickness and resistivity of the epitaxial layer will effect resolution and sensitivity of the spectrometer, and therefore can be adjusted to achieve a wide range of sensitivities. A thicker epitaxial layer results in higher sensitivity with decreased precision. The epitaxial layer is desirably about 0.5 microns thick.

A thin dielectric layer 17, in the range of 0.1 microns, is formed over the epitaxial layer. Contact windows are opened in dielectric layer 17 and an opaque conductive layer is deposited. The conductive layer is patterned into a serpentine diffraction grid 13 and a contact pad 14. Subsequently, diffused regions are formed by a process such as ion implantation of a dopant of the same conductivity type as substrate 11. Diffused regions 16 result in the light sensing elements 12 which are formed underneath diffraction grid 13 and self aligned to diffraction grid 13. It will be apparent to those of skill in the art that a variety of process steps and methods can be used to form a similar structure to that illustrated in FIG. 3.

A semiconductor junction is formed between diffused regions 16 and light sensing elements 12, and depletion region forms around the junction. As light energy passes through this depletion region electron-hole pairs are created, and charge develops in light sensing element 12. Diffraction grating 13 serves to filter light which enters the depletion region so that only desired wavelengths are available to produce charge in light sensing element 12.

It should be noted that the process described hereinbefore required only two mask steps and required patterning and etching of only very thin layers which is conducive to fine line lithography. It is important that layer 13 is opaque and conductive, not that it is metallic. If diffraction grating 13 is not used as an electrode, it need not be conductive, but some other method of contacting light sensing elements 12 must be provided.

Figure 4:
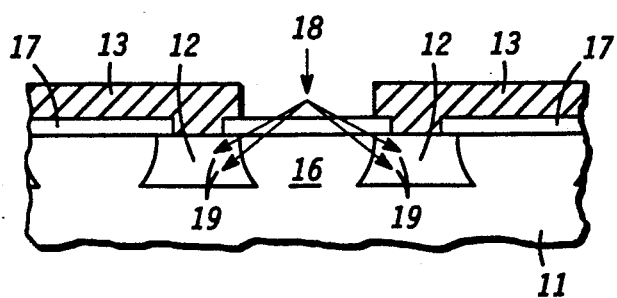
FIG. 4 illustrates a highly enlarged cross section of the embodiment shown in FIG. 3.

FIG. 4 illustrates a highly magnified view of the third embodiment shown in FIG. 3. Polychromatic light illustrated by arrow 18 is incident on the device. Diffraction grating 13 causes incident light 18 to be dispersed dependent on wavelength. The angle of dispersion ($\theta$) is determined by the formula:

$$\sin \theta = \frac{K\lambda}{d}$$

where d is the width of diffraction grating 13, λ is the wavelength, and K is an integer representing the order of diffraction. In FIG. 4 θ is the angle between incident beam 18 and diffracted beams 19. Although only two beams 19 are shown, it should be understood that many diffracted beams, each with a unique angle θ will actually be formed.

The zero order and the first order (K=0 or 1) contain most of the energy of the diffracted light. It can be seen that the zero order will not be diffracted at all and will travel straight through at the same angle as incident beam 18. The first order diffraction, however, will result in each wavelength of diffracted light taking a different path. A small range of dispersion angles illustrated by arrows 19 result in diffracted wavelengths which penetrate light sensing element 12. Zero order wavelengths do not penetrate light sensing 12 and thus produce no signal. Since the angle of diffraction is a function of the spacing and slit size of diffraction grating 13, the wavelengths of light which pass into light sensing element 12 are a function of the pitch of diffraction grating 13. Thus, as the pitch of diffraction grating 13 is changed, light sensing elements 12 become sensitive to different wavelengths. It is believed that peak wavelength, λp, sensitivity of a light sensing element 12 is approximated by the equation:

$$\lambda_p = (d) \sin\left(\tan^{-1}\left[\frac{d}{2T}\right]\right)$$

where d is the spacing between slits in diffraction grating 13 and T is the thickness of dielectric 17.

Figure 5:
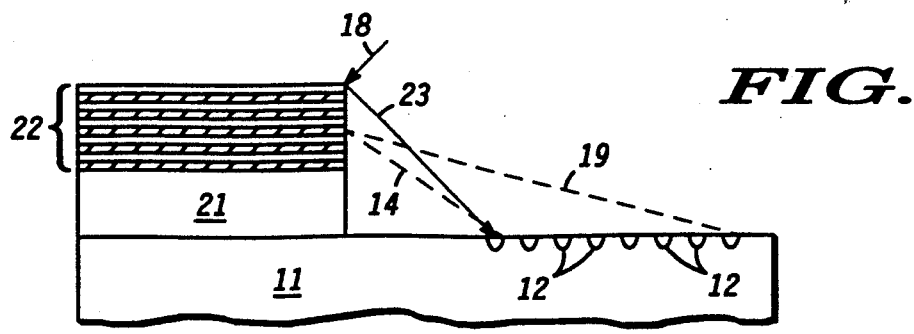
FIG. 5 illustrates a fourth embodiment of the present invention.

FIG. 5 illustrates a fourth embodiment of the present invention which utilizes a reflective grating rather than a diffraction grating. In this embodiment an array of light sensing elements 12 are formed in substrate 11. Light sensing elements 12 are spaced as near to each other as possible to improve precision of the device. A spacer 21 is formed on substrate 11. Diffraction grating 22 is formed by depositing alternating layers of reflective and non-reflective material. Using this technique, a diffraction grating can be achieved having spacings and pitch of only a few hundred angstroms if desirable. Although such small grating spacing may not be useful for visible light, as visible wavelengths would be dispersed rather than diffracted, it can be useful for higher energy diffraction of electromagnetic energy. Incident light 18 is polychromatic and will reflect from diffraction grating 22 with a diffraction pattern described by:

$$\sin \theta = \frac{K\lambda}{d}.$$

Zero order diffraction illustrated by arrow 23 is merely a pure reflection of all the wavelengths in polychromatic light 18. Dashed lines 19 indicate the diffracted light which is reflected from diffraction grating 22. The diffracted light will spread at a wider angle than the zero order diffraction shown by arrow 23. The exact angle and spreading width of diffracted light 19 is a function of grating spacing and thus layer thickness of diffraction grating 22.

Light sensing elements 12 are spaced from diffraction grating 22 and spacer 21 to avoid detection of the zero order diffraction while encompassing as much of the spectrum of diffracted light 19 as possible. Spacer 21 is primarily a mechanical spacer to elevate diffraction grating 22 so that diffracted light 19 is spread away from zero order diffraction 23. Thus, light sensing elements 12 each are exposed to a different wavelength of diffracted light. The fourth embodiment illustrated in FIG. 5 is particularly useful for diffracting wavelengths which are shorter than the visible spectrum, but can be used for visible light diffraction if diffraction grating 22 has layers which are in the order of 1.0 micron thick. It should also be noted that by etching diffraction grating 22 so that instead of a vertical sidewall it has a sloped or stepwise sloped sidewall, diffraction grating 22 can be blazed to achieve greater intensity and separation of first order diffracted light 19.

Performance of any of the embodiments described may be improved by processing or filtering the incident beam before it passes through the diffraction elements. Such processing could include collimating, polarizing, filtering, or the like. Such processing could be intergrated on top of the diffraction elements if desired. Also, all of the embodiments described are highly intergrateable with CMOS or bipolar logic processes. It is believed that signal processing logic, when integrated on the same semiconductor chip as a diffraction spectrometer, will result in significantly improved signal to noise ratio and sensitivity.

A variety of modifications of the present invention will be obvious to those of skill in the art. The reflection grating and diffraction grating embodiments may be combined to improve sensitivity. Also, other shapes may be used to form diffraction elements, such as a series of round holes of various sizes instead of the ladder like diffraction elements illustrated in FIGS. 1-3. Further, diffraction elements may be stacked vertically so that incident light must pass through a plurality of diffraction gratings before reaching a light detector.

By now it should be apparent that an improved spectrometer is provided having a diffraction grating formed directly on a semiconductor wafer. An array of light sensing elements are positioned in the path of the diffracted light to achieve sensitivity to a particular wavelength. The diffraction grating thus provided can be used as a monochrometer or spectrometer by using either single pitch diffraction grating or multiple pitch diffraction grating, respectively. The monolithic spectrometer requires a minimum of process steps and is compatible with conventional semiconductor processing technology. Improved sensitivity is achieved by diffraction grating width and slit width of the diffraction grating which are in the order of, or smaller than, the wavelength of light which is to be analyzed. By using monolithic semiconductor processing technology, a compact spectrometer is provided with minimal cost and complexity compared to conventional diffraction spectrometers.

We claim:

1. A spectrometer comprising: a semiconductor substrate; an array of light sensing devices formed in the substrate; and an opaque diffraction grating formed on the substrate wherein the diffraction grating has a variable pitch.

2. The spectrometer of claim 1 wherein the variable pitch ranges from 0.5 microns to 1.0 microns.

3. A spectrometer comprising: a semiconductor substrate; an array of light sensing devices formed in the substrate; and an opaque diffraction grating formed on the substrate wherein the diffraction grating comprises a patterned conductive layer.

4. A method of spectral analysis comprising the steps of: providing a substrate; providing an array of photon sensing devices on the substrate, wherein the photon sensing devices are isolated from each other; providing a diffraction grating above the photon sensing devices, wherein the diffraction grating has a variable pitch; exposing the diffraction grating to a light to be analyzed; and detecting a signal from the array of photon sensing devices.

5. The method of claim 4 further comprising the step of applying a narrow bandwidth of photons to each of the photon sensing elements.

6. A monolithic semiconductor spectrometer comprising: an array of light sensing elements; a fan-shaped diffraction filter formed over the light sensing elements; and electrodes coupled to the light sensing elements.

7. The spectrometer of claim 6 wherein the diffraction filter comprises an opaque material.

8. A solid state imaging device comprising an array of light sensing elements and a variable pitch diffraction grating formed over the light sensing elements.

9. The device of claim 8 further comprising a transparent dielectric formed between the sensing elements and the diffraction grating.

10. A solid state spectrometer comprising: a monolithic array of light sensing elements; and a reflection grating formed adjacent to the array of light sensing elements wherein the reflecting grating comprises alternating layers of reflective material and transparent material.

* * * * *